United States Patent

[11] 3,609,014

| [72] | Inventor | Arthur W. Kurz, Jr.<br>P.O. Box 454, Birmingham, Mich. 48012 |
|---|---|---|
| [21] | Appl. No. | 45,141 |
| [22] | Filed | June 10, 1970 |
| [45] | Patented | Sept. 28, 1971<br>Continuation-in-part of application Ser. No.<br>467,064, June 25, 1965, now abandoned. |

[54] ELECTRIC REMOTE CONTROL REAR VIEW MIRROR
5 Claims, 14 Drawing Figs.

[52] U.S. Cl. .......................................... 350/289,
74/459, 85/32 V, 248/481, 310/209
[51] Int. Cl. .................................................. G02b 5/08,
B60n 1/06
[50] Field of Search........................................... 85/32 V,
36, 32 R; 310/191, 209; 74/459, 424.8, 501 M;
248/479, 481; 350/289, 307, 288, 303, 304

[56] References Cited
UNITED STATES PATENTS

| 858,847 | 7/1907 | Allen | 40/93 X |
| 2,081,299 | 5/1937 | Hill | 350/295 |
| 2,118,709 | 5/1938 | Lebby | 310/209 X |
| 2,725,437 | 11/1955 | Fields et al. | 85/33 |
| 3,027,807 | 4/1962 | Barcus et al. | 350/289 |
| 3,196,463 | 7/1965 | Farneth | 287/21 X |

*Primary Examiner*—David Schonberg
*Assistant Examiner*—John W. Leonard
*Attorney*—Cullen, Settle, Sloman & Cantor

ABSTRACT: An electric remote power-controlled rearview mirror for a vehicle, which is adapted to be mounted externally of the vehicle adjacent the windshield and at the left or right side of the vehicle for convenient viewing by the operator of the vehicle. The mirror is pivotally supported by a three-point pivot connection of which the center pivot connection is stationary to permit angular movement of the mirror therearound. The remaining two pivot connections are spaced an equal distance radially outwardly from the center pivot and are connected to pins or rods which are individually actuatable for longitudinal movement by power means including at least one reversible motor to thereby positively angularly adjust the mirror around the center pivot.

PATENTED SEP 28 1971

INVENTOR
ARTHUR W. KURZ

BY Cullen, Settle, Sloman & Cantor

ATTORNEYS

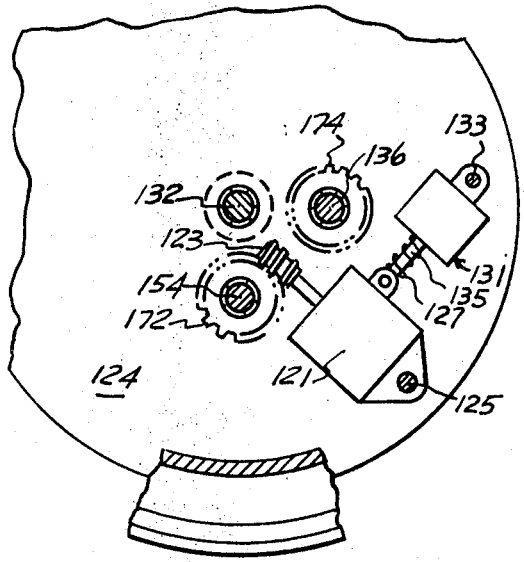
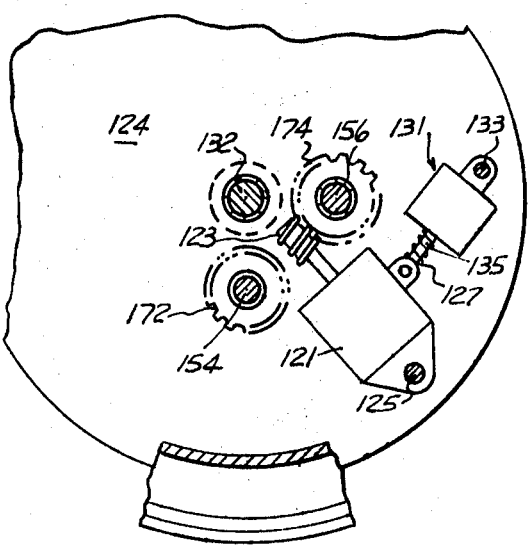
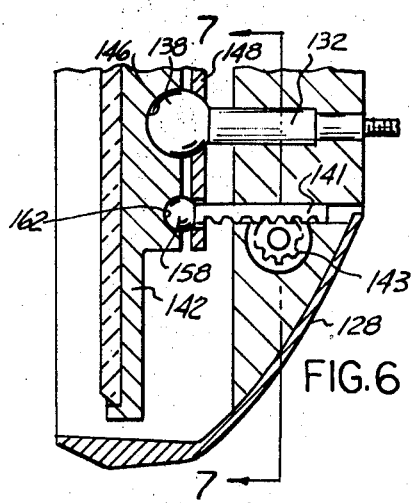
INVENTOR
ARTHUR W. KURZ

PATENTED SEP 28 1971

INVENTOR
ARTHUR W. KURZ
BY Cullen, Settle, Sloman & Cantor
ATTORNEYS

INVENTOR
ARTHUR W. KURZ

BY Jullen, Settle, Sloman & Cantor

ATTORNEYS 3,609,014

ELECTRIC REMOTE CONTROL REAR VIEW MIRROR

REFERENCE TO RELATED APPLICATIONS

The present application is a continuation-in-part of copending application Ser. No. 467,064, now abandoned, filed June 25, 1965 in the name of Arthur W. Kurz, Jr. for ELECTRIC REMOTE CONTROL REAR VIEW MIRROR.

BACKGROUND OF THE INVENTION

This invention relates to automotive accessories, such, for example, as rearview mirrors and spotlights, and particularly to the control of the position of such rearview mirrors or spotlights located on the outside of a vehicle. More particularly, my invention is directed to the use of electrical devices connected to the accessory mounting support and controlled by manually operably devices positioned within reach of the driver or a passenger seated within the driver's compartment of the vehicle to move the accessory for selective adjustments about a vertical and horizontal axis.

As the driving speeds of motor vehicles increases, it becomes increasingly important that rearview mirrors be located as nearly as possible in the line of vision to permit drivers to observe traffic conditions behind the car without shifting their eyes too far out of the line of travel of the vehicle. Mirrors located externally of the vehicle provide an excellent rear view of the road and traffic conditions, but difficulties have been experienced in adjusting such mirrors. Where the mirror is positioned out of the reach of the driver or passenger while seated in the vehicle, a helper is requires to make the necessary adjustments. A helper is not always available to correct the angular position of the mirror for drivers of varying stature who may alternately operate the same vehicle, or to restore the desired angular position after it may have accidentally been moved.

For the above reasons, attempts have been made to provide mechanisms to remotely control the outside accessory, such as a mirror, a spotlight, or the like.

The most common conventional arrangement in this particular kind of field was, to utilize some kind of mechanical actuation, such as a linkage mechanism or a Bowden cable arrangement for the mirror or the accessory, which was actuatable by the driver of the vehicle from inside of the vehicle. However, these conventional, mechanical remote control arrangements have definite limitations in regard to the range of angular adjustment of the mirror or other accessory.

The application of the mechanical linkage remote control mechanism required complicated pivoting arrangement for the interconnected levers which, in turn, required time consuming and difficult to produce support structures for the mirror, involving prohibitive cost in manufacturing. Furthermore, the multiple pivot connections of the interconnected levers of the linkage or rod-adjusting mechanism had to be lubricated periodically in order to function properly under any operating conditions.

The conventional remote control Bowden cable arrangement, although considerably simplifying the adjusting mechanism by the elimination of any intermediate pivot connections and thereby reducing cost in production and assembly, still has an inherent disadvantage concerning the angular adjustment range of the mirror, similar to the problem connected with the linkage mechanism. In the Bowden cable remote control arrangement, there is a definite point limit to which the individual push and pull wires of the Bowden cable can be stretched to obtain maximum angular positioning of the mirror or other accessory. Extension of the wires of the Bowden cable beyond this limitation, will cause the wires to kink and bend since their rigidity is dependent on the length from which they extend from the supporting cable.

In addition, as mentioned before, mechanical remote control actuation of an outside rearview mirror or the like, by means of conventional linkage or Bowden cable arrangement, require supporting structures for the mirror which are difficult and costly to manufacture.

In view of the above-mentioned difficulties of mechanical, remote control arrangements, other control means, such as fluid pressure or electrical power actuated, have been suggested to remotely control the angular adjustability of outside rearview mirrors, or similar accessories for vehicles.

The present invention is concerned with remote electrically controlled mirror-adjusting devices.

An electric, remote control mirror-adjusting arrangement is known in which the mirror is centrally supported for universal angular pivotal arrangement on a ball and socket arrangement. In the known device, the angular adjusting means for the mirror around a vertical and horizontal axis is provided by a pair of small electrical motors contained within the mirror support housing which are adapted to actuate a pair of stud members for movement in longitudinal, axial direction which are disposed at an angle substantially normal to the plane of the mirror. In the known device, these comprise a pair of studs actuated by the pair of motors which are disposed in radially and angularly spaced distance relative to the center pivot of the mirror and which have at their ends a bearing surface abutting against the backing plate of the mirror. In a dead center position, the center plane of the mirror will be disposed in parallel position to the center plane of the supporting structure having the bearing surfaces of the stud members abutting against the backing surface of the mirror at points equally spaced from the center pivot of the mirror. If the mirror, in the known device, is to be angularly adjusted by actuation of either of the motors to cause longitudinal, axial movement of either of the stud members relative to the support, their abutting points of the bearing surfaces of the actuated stud members on the backing surface of the mirror will be shifted along that surface, since the bearing surfaces of the stud members are not attached at a fixed location to the backing surface of the mirror. This causes considerably friction between the bearing surfaces of the stud members and the backing surface of the mirror, ultimately resulting in wear on the backing surface of the mirror, producing misalignment and inaccurate adjusting movement of the mirror. Furthermore, since the pair of adjusting studs, in the known device, are not positively connected to the mirror, a compensating pressure means such as a spring or the like, has to be employed in the known device to maintain the backing surface of the mirror in operable contact with the bearing ends of the pair of studs. Because of expansion and contraction which occurs to alternately store and spend energy, the life expectancy of the spring is limited due to fatigue, thus adding to the misalignment and inaccuracy in adjustment of the mirror. Fatigue of the spring or other pressure-producing means in the known electrical mirror-adjusting device, to maintain the mirror in abutment against the adjusting studs, also produces a looseness in the assembly causing the mirror to flutter or vibrate during travel of the vehicle, which, of course, is objectionable in view of the annoyance caused to the person looking in the mirror.

A further problem encountered in the operation of remote controlled outside rearview mirrors, relates to moisture and pollution condition of the atmosphere surrounding the outside mirror. Thus, under freezing or below zero temperature conditions, the known control devices were found to be operable only after the engine of the vehicle was sufficiently warmed up. Prior to the present invention, under most freezing conditions, the mechanism of the known control devices could not sufficiently be operated, since under these conditions, the moving parts of the mechanism located outside of the vehicle, were frozen in their supports, so as to be immovable. This condition was further compounded by ice or frozen snow accumulation between the mirror and the mirror housing and mirror support.

SUMMARY OF THE INVENTION

An object of my invention resides in the provision of an improved rearview mirror positioning control mechanism for a vehicle wherein a single manually operable member mounted in the driver's compartment is employed to vary the angular position of the mirror about intersecting axes.

A further object of my invention is to provide an improved electrically actuated control mechanism for a rearview mirror wherein a four-position switch is employed to control the movement of a pivotally mounted mirror to move it to any desired adjusted position, and wherein, if desired, two adjustments may be made simultaneously.

Still another object of my invention is to provide a remotely controlled mirror which the driver can adjust while driving to enable the driver to scan the area behind the vehicle to observe road and traffic conditions.

Another object of my invention is to provide an improved rearview mirror or spotlight control for a vehicle wherein a mirror is pivotally mounted for universal movement about intersecting axis and electrical means, such as motors or solenoids are employed to control movement of the mirror.

Yet another object of my invention is to provide an improved motion translating mechanism having separately operably geared motion transmitting means operated by a switch mechanism located in the driver's compartment of a vehicle.

Still another object of my invention resides in the provision of a three-point pivot arrangement for an adjustable rearview mirror, one of the pivot points being located at the center of the mirror and the other two pivot points being located at an equal fixed distance from the center pivot point and located substantially 90° apart from each other to thereby obtain true vertical and horizontal adjustment.

Still a further object of my invention is to provide an improved combination accessory control such, for example, as a rearview mirror adapted to be mounted on the vehicle body forwardly of the driver's compartment and wherein the position of the accessory can be accurately controlled by a four-position switch located in the driver's compartment and wherein the switch lever is moved in the direction in which it is desired to move the accessory.

Other objects of this invention will appear in the following description and appended claims, reference being had to the accompanying drawings forming a part of this specification wherein like reference characters designate corresponding parts in the several views.

IN THE DRAWINGS:

FIG. 4 is a fragmentary sectional view similar to FIG. 3, illustrating a modified control mechanism wherein a single motor is employed;

FIG. 5 is a view similar to FIG. 4, showing the mechanism in a different operating position;

FIGS. 6 and 7 are fragmentary views similar to portions of FIGS. 2 and 3, illustrating a modified form of control;

FIG. 8 is a view similar to FIG. 2, illustrating a still further modified form of my invention;

DESCRIPTION OF THE PREFERRED EMBODIMENTS

Figure 1:
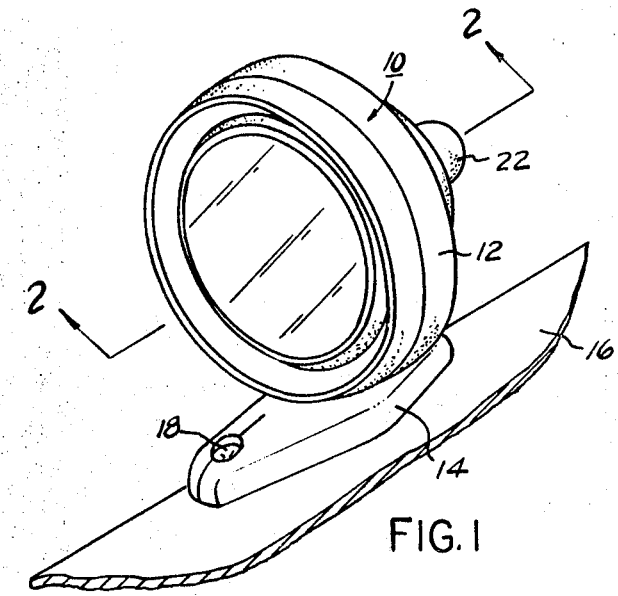
FIG. 1 is a fragmentary perspective view illustrating my accessory control as applied to an improved rearview mirror.

Referring now more particularly to FIG. 1, an accessory such as a rearview mirror assembly 10 has a head 12 and a base 14. The base 14 is contoured to provide an elongated structure adapted to blend with the styling of a portion 16 of the vehicle, such, for example, as a front fender, and the base 14 is adapted to be secured thereto by suitable fastening means, one of which is illustrated at 18.

Figure 2:
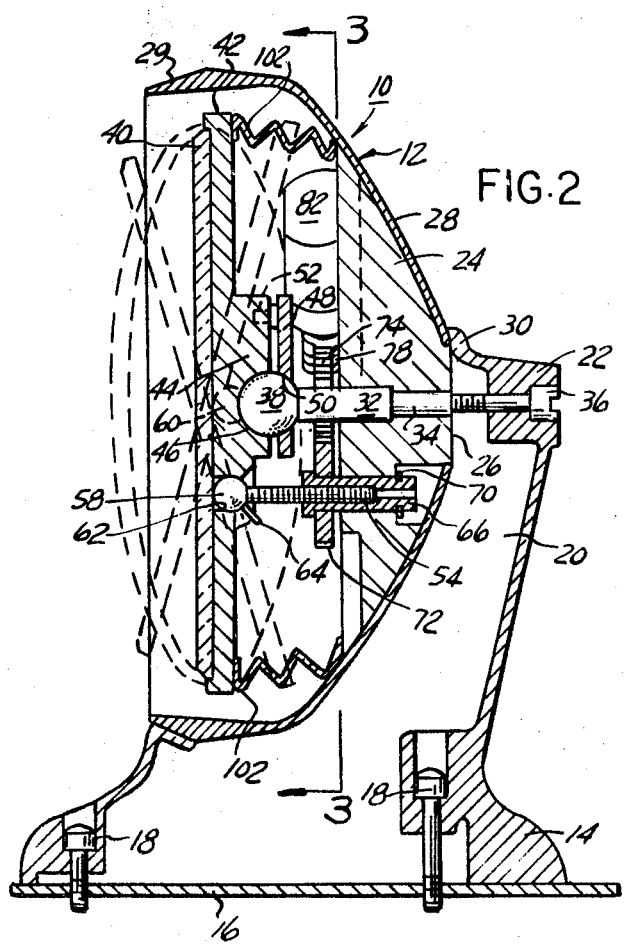
FIG. 2 is an enlarged longitudinal sectional view thereof taken substantially on the line 2—2 of FIG. 1, looking in the direction of the arrows.

Referring now to FIG. 2, it will be noted that the base 14 has an upstanding, preferably streamlined portion 20 terminating in a cylindrical or rounded section 22 at the upper rear end.

The head assembly 12 consists of a support member 24 having a contoured section 26 to receive the flared inner portion of a shell 28, as illustrated. The rounded section 22 has a flanged portion 30 adapted to overlie a portion of the outer, generally conical-shaped portion of the flared shell 28. The support member 24, and shell 28 are secured to the rounded section 22 of the streamlined portion 20 of the base 14 by means of a stud 32 having a reduced diameter portion 34 adapted to project through an aperture in the support member 24, and having a threaded inner end to be engaged by a threaded screw 36 by which the support member 24, shell 28 and base 14 are secured together. The stud 32 projects through the support member 24, and is provided with a mirror-mounting member in the form of a ball 38.

The rearview mirror assembly consists of a glass 40 having a suitable reflective material on one of its faces. The glass 40 is secured in any desired manner to support plate 42 having a thickened central section 44 having a substantially spherically shaped centrally disposed cavity 46 to receive the forward end of the ball 38 in such a manner that the support plate 42 and glass 40 may oscillate to adjusted positions on the ball 38 and stud 32. A securing member 48, having a central aperture 50 suitably contoured to engage the rear spherical portion of the ball 38 is adjustably secured to the thickened central portion 44 of the support plate 42 as by suitable fasteners 52 to adjustably secure the ball 38 in the spherical seat 46 of the plate 42.

Means are provided to adjust the angular position of the mirror 40 on the ball 38 about intersecting axes preferably, but not necessarily, disposed at 90° angles relative to each other. One suitable form of such angular adjusting means comprises a pair of threaded studs 54 and 56 each having a ball-shaped end 58 and 60, respectively, secured within part spherical apertures 62 formed in the back surface of the support plate 42, and suitably locked against rotation therein by any convenient restraining device such, for example, as a pin 64 engaging in a slot (not shown) in the balls 58 and 60, respectively, to restrain them from rotating relative to the support plate 42.

Figure 3:
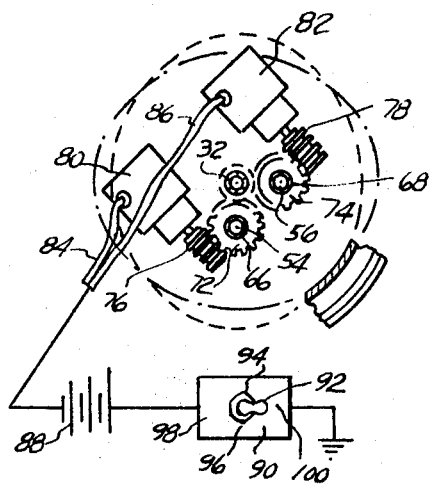
FIG. 3 is a sectional view taken substantially on the line 3—3 of FIG. 2, looking in the direction of the arrows, and illustrating the four-position switch mechanism adapted to be positioned in the passenger compartment of the vehicle.

The threaded studs 54 and 56 are preferably disposed in planes substantially at right angles and intersecting the axis of the stud 32 and ball 38, as shown in FIG. 3, so that, as either of the studs 54 or 56 is moved back and forth relative to the support member 24, the support plate 42 and the mirror 40 are oscillated about the supporting ball 38 to adjust the angularity of the mirror relative to the viewing position of the driver or occupant in the passenger's compartment of the vehicle.

One desirable form of mechanism for selectively shifting the threaded studs 54 and 56 axially relative to the support member 24, consists of internally threaded nuts 66 and 68 journaled for rotation in the support member 24, as shown in FIGS. 2 and 3, and held in place therein, for example, as by snap rings 70. The internally threaded nuts 66 and 68 have gears 72 and 74 fixed thereto. The gears 72 and 74 are rotated by worm gears 76 and 78 driven by small electric, reversible motors 80 and 82 respectively, mounted on the support member 24, and which are supplied with electrical energy through wires 84 and 86 from a source of electric energy, such as a conventional battery 88 of the vehicle.

The flow of current from the battery 88 to the motors 80 and 82 is controlled by a four-position switch 90 illustrated in FIG. 3. In the switch 90, a centrally disposed actuating lever 92 may selectively be moved to four positions, for example, to the upper position 94 to energize the motor 80 to rotate the gear 72 and sleeve 66 to move the threaded stud 54 toward the left, as viewed in FIG. 2, to elevate the viewing position of the mirror 40.

Conversely, when the actuating lever 92 is moved to the lower position 96, the motor 80 is driven in the opposite direction to move the threaded stud 54 toward the right as viewed in FIG. 2, to lower the viewing position of the mirror 40.

Also, it will be appreciated that, when the actuating lever 92 is shifted toward the horizontal position 98, as viewed in FIG. 3, the motor 82 is actuated to move the threaded stud 56 away from the support member 24 to shift the viewing position of the mirror 40 toward the left. As the actuating lever 92 is shifted horizontally towards the position 100, the threaded stud 56 is moved into the support member 24 to shift the viewing position of the mirror 40 toward the right.

It will thus be apparent that I have provided a simple rearview mirror construction wherein the mirror 40 is positioned within and protected by the cylindrical radial flange 29 of the flared shell 28. A bellow-type seal 102 is interposed between the back of the mirror and the support member 24 and shell 28 to prevent the entrance of water and dirt into the actuator space. The mirror is readily moved to angularly adjusted positions by the motors 80 and 82 interposed between the mirror member 40 and the support member 24 in such a manner that it is not necessary for the driver or passenger of the motor vehicle to manually grasp the mirror to move it to the desired adjusted position. Also, it will be apparent that I have provided a simple control for the rearview mirror or other vehicle accessory devices herein a single actuating lever 92, conveniently positioned on the instrument panel or elsewhere in the driver's compartment of the vehicle, may be moved in the direction in which it is desired to have the mirror or other accessory move.

The embodiment of my invention illustrated in FIGS. 4 and 5 is similar in many respects to that illustrated in FIGS. 2 and 3. Corresponding parts have therefore been given corresponding reference numerals with the addition of 100.

Rather than utilizing to separate electric motors 80 and 82 to drive the position orienting gears and studs, as in the FIGS. 2 and 3 embodiment, a single electric motor 121, having a worm gear 123, is employed. The worm gear 123 is interposed between, and is adapted to selectively engage with each of the gears 172 and 174 which control movement of the threaded studs 154 and 156, respectively, to vary the angularity of the mirror, or other accessory, about a vertical and horizontal axes.

The single electric motor 121 is pivotally mounted at 125 on the support member 124, and is shiftable angularly about the pivot 125 to selectively engage the worm gear 123 with the gear 172 or with the gear 174. A yielding means, such for example, as a spring 127, is employed to normally urge the motor 121 in the counterclockwise direction, as viewed in FIG. 4, to engage the worm gear 123 with the gear 172 to adjust the mirror around a vertical axis when the actuating lever 92 is moved to the positions 94 or 96 (FIG. 3).

A solenoid 131, pivotally mounted at 133 on the support member 124, is employed, which is adapted, when energized, to retract the core member and shaft 134, thereby pivoting the motor 121 in the clockwise direction about the pivot point 125 to engage the worm gear 123 with the gear 174. The solenoid 131 is energized to shift the motor 121 to engage the gear 174 when the switch lever 92, illustrated in FIG. 3 is actuated to adjust the mirror around a horizontal axis.

The embodiment illustrated in FIGS. 6 and 7 is similar in many respects to that illustrated in FIGS. 2 and 3. It will be noted that instead of the threaded studs 54 and 56 controlling the angular adjustment of the accessory, geared racks 141 are employed in lieu of the threaded studs 54 and 56. The racks 141 are similarly provided at their inner end with a ball head 158 suitably secured within partially spherical recess 162 in the support plate 142. In this embodiment of my invention, electric motors, one of which is illustrated in FIG. 7 at 180, are provided with a gear 143 driven by the electric motor 180 through a suitably speed reducer or gear box illustrated at 145. In this embodiment of my invention, the control of the mirror is by the single switch-actuating lever 92 in substantially the same manner as in the other embodiments of my invention.

The embodiment illustrated in FIG. 8 is generally similar to the other embodiments herein discussed, it being noted that the accessory control driving motor, one of which is illustrated at 180, has a suitably speed reducer 145 associated therewith. A threaded shaft 147 driven by the motor 180 engages an internally threaded all 149 suitably retained against rotation within a partially spherical recess 151 in the back of the support plate 142. The same type of switch and switch-actuating lever 92 is employed to control the adjustment of the mirror, as in the FIGS. 2 and 3 embodiment.

Referring now to the embodiment illustrated in FIGS. 9 through 12, the preferred embodiment is contained within a shell 220 having a closed rear end 222, which is pivotally connected by means of a ball and socket joint 224, which is provided with a threaded stud 226, to a suitably support 228, which, in a known manner, is secured to an outside portion of the vehicle (not shown). By this arrangement, the mirror housing shell 220 as well as the entire remote control mirror assembly 230 can be manually angularly adjusted, vertically and horizontally, without affecting the remote control mechanism of the mirror, to be described hereinafter in detail.

The remote control mirror assembly 230 comprises a mirror 40 appropriately secured to a backing plate 232 to the rear of which is secured a support plate 234 substantially at the center of the mirror.

Figure 11:
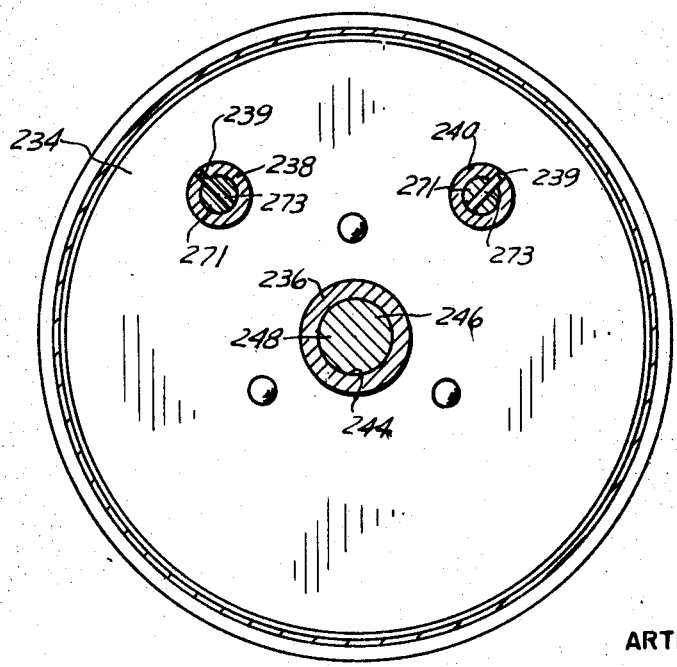
FIG. 11 is a fragmentary cross section of the mirror supporting structure as seen in the direction of the arrows 11—11 of FIG. 9.

The support plate 234 hay a centrally located axially rearwardly extending boss portion 236 formed integral therewith, and, as seen in FIG. 11, a pair of smaller rearwardly extending boss portions 238 and 240. As further seen in FIG. 11, the smaller boss portions 238 and 240 are radially spaced from each other substantially at 90° angle and are equally spaced from the center boss portion 236.

The center boss portion 236 is provided with an aperture 242, which terminates outwardly into a spherical seat portion 244 forming thereby a socket member for a ball 246 which extends into the aperture 242 and into abutment with the rear backing plate 232. The ball 246 comprises a central pivot point for the mirror 40 around which the mirror is adjustable horizontally and vertically. Outwardly the boss portion 236 is provided with a convex surface 237 for a purpose to appear.

The ball 246 is provided with a threaded bore to receive a securing and adjusting screw 248, which extends outwardly of the ball along the central axis of the mirror assembly and rotatably into and through a boss portion 250 disposed in juxtaposition to the boss portion 236 of the support plate 234. The boss portion 250 forms part of an inner plate member 252 rearwardly overlying the mirror support plate 234 and an associated outer plate member 254 overlying the inner plate member 252. Both plate members 252 and 254 are suitably secured together to form a motor and gear mechanism supporting unit 256, which is preferably provided with rearwardly extending bosses or the like, 258 for securement to the rear portion 222 of the shell 220 by means of screw fasteners 260.

A resilient washer 262, preferably of rubber or the like, is inserted between the opposed boss members 236 and 250 for extension around the screw 248 and is disposed immediately adjacent the ball 246 and in contact therewith. The washer 262 provides a resilient stop means to adjustably limit the total angular travel of the mirror by abutment against the convex surface 237 of the boss portion 236 and at the same time preloads the ball 246 and retains the all under tension within the socket 244. Tension and preload of the all 246 against the washer 262 is adjustable by means of rotation of the screw 248. The resilient washer 262 after being compressed by adjustment of the mirror, tends to urge the mirror assembly into the neutral, that is, unadjusted position, as that of FIG. 9.

The motor and gear mechanism support unit 256, composed of the inner plate member 252 and outer plate member 254, is formed to comprise a first pair of enclosures 264 and 266, which are disposed radially spaced from each other in juxtaposition to the pair of smaller boss members 238 and 240 extending from the mirror support 234. The spaced enclosures 264 and 266 are adapted to each receive a nut member 268 disposed for rotation therein around a threaded rod 270. Each of the nut members 268 is provided with an axial bore 272, which is provided with internal threads, or the like, for threading engagement with a threaded rod 270. The nut members 268 are confined by the respective enclosures 264 or 266 against longitudinal travel along the rod 270 upon rotation of the nut member.

Figure 13:
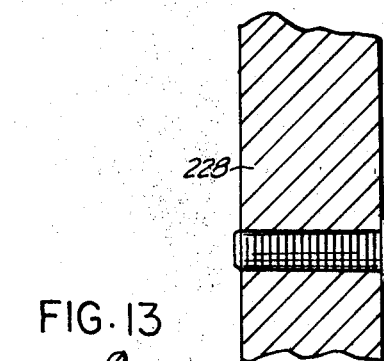
FIG. 13 is an enlarged fragmentary cross section through a further embodiment of gear and screw rod drive mechanism.
Figure 14:
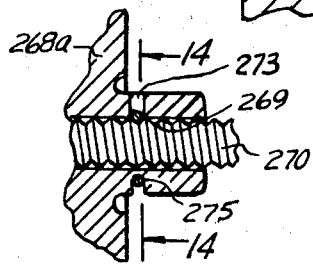
FIG. 14 is a transverse cross section through the view in FIG. 13 along lines 14—14 thereof.
Figure 9:
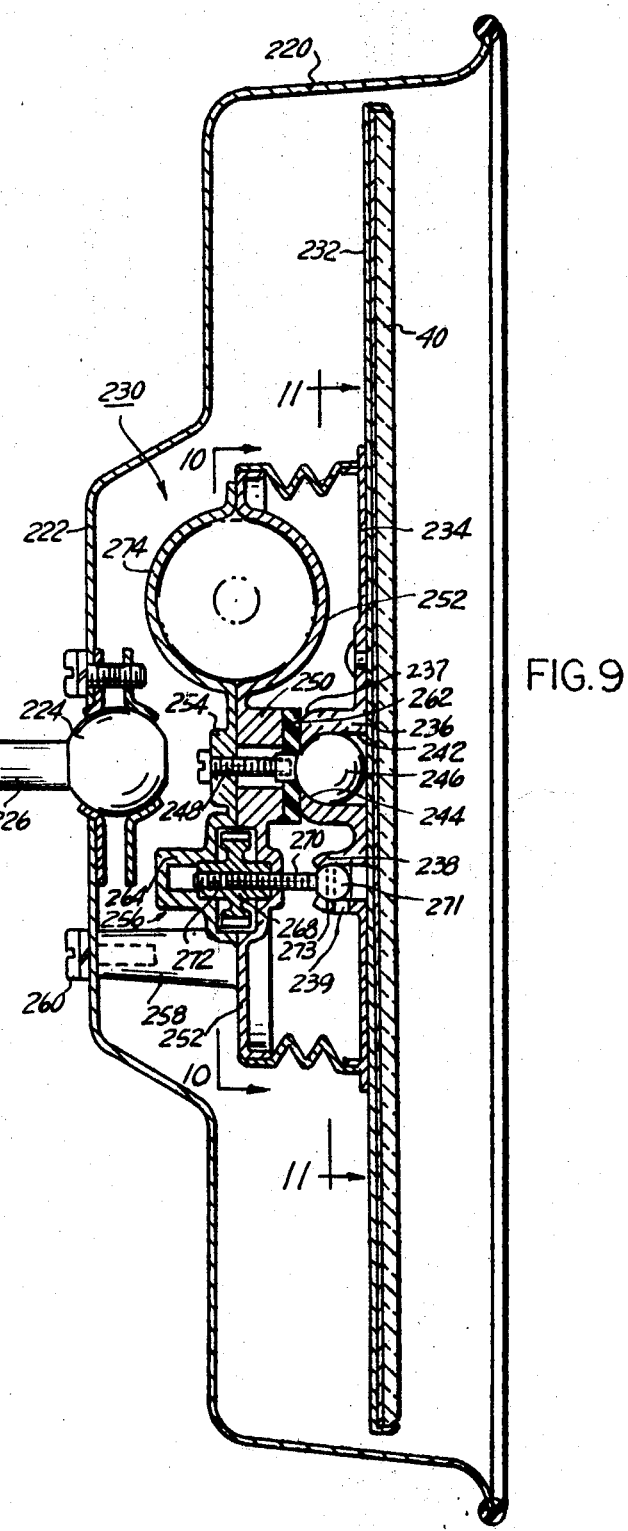
FIG. 9 is a longitudinal cross section of a further modified preferred embodiment of a remote controlled adjustable rearview mirror constructed in accordance with the present invention.

Conversely, as shown in the embodiment in FIGS. 13 and 14, the nut member 268a instead of being provided with internal threads has a substantially smooth bore 269 surrounding the threaded rod 270 and is provided with a hair pinlike spring 275 which extends transversely through the nut member by means of slots 273 for driving engagement with the threads of the threaded rod 270. This arrangement is provided to enable manual adjustment of the mirror around the center ball 246 in case of malfunction of the electric drive. The resiliency of the spring 275 permits the threaded rods 270 to be moved manually in or out of the nut member 268a by the ability of the thread engaging spring arm to ride over the threads of the rods 270.

Each of the threaded rods 270 extends outwardly of the respective enclosures 264 and 266 towards the boss members 238 and 240, respectively, and are each provided at the ends with a ball member 271, which is confined in the spherical seat 239 provided in each of the boss portions 238 and 240 for universal pivotal movement of the mirror support plate 234 therearound. To prevent the ball 271 and the threaded rod 270, attached thereto, from rotation, each of the balls 271 is provided with a pin secured transversely within the ball and extending a small distance outwardly for engagement of the pin 273 within a slot 241 provided in each of the boss portions 238 and 240. Thus, the pin 273 positively prevents the threaded rod 270 and the ball 271 from rotation when the nut 268 is being rotated. Thus, rotation of the nut 268, which is confined against axial movement will cause longitudinal movement of the threaded rods 270 in or out of the enclosure 256.

Figure 10:
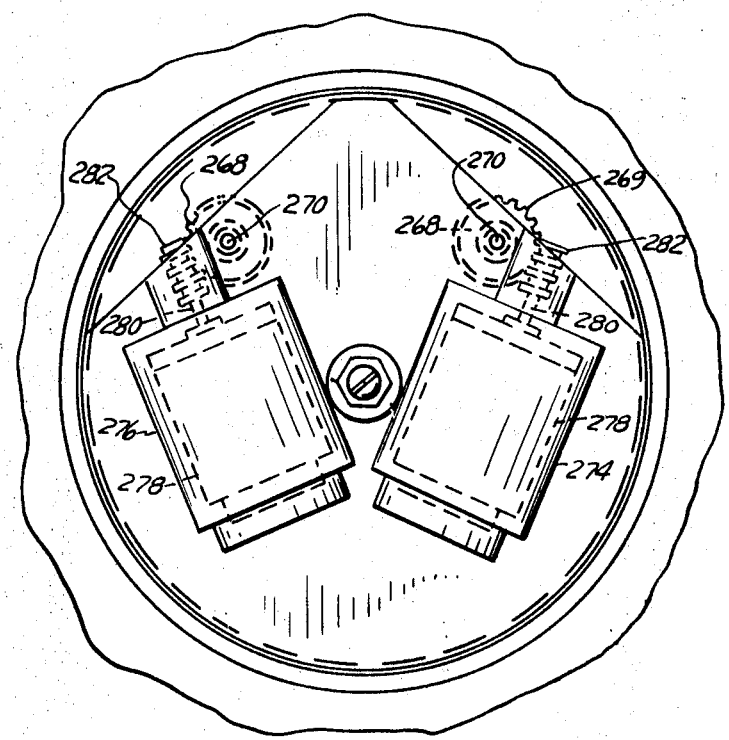
FIG. 10 is a plan rearview of the mirror assembly in FIG. 9, as seen in the direction of the arrows 10—10.

With particular reference to FIGS. 10 and 11, the pair of opposite plate members 252 and 254 are further provided with another pair of outwardly bulging enclosures 274 and 276, respectively, disposed on opposite sides of the center adjusting screw 248, which, in assembled position of the plate members 252 and 254, provide each a cylindrical enclosure to each contain and support a motor 278 therein.

Since both driving arrangements for the threaded studs 270 are identical, it will suffice to describe only one arrangement it being understood that the same reference numerals and terminology applies to the opposite driving arrangement.

Thus, the motor 278 retained within the cylindrical enclosure 274 of the plate members 252 and 254 is a small electric motor preferably of the permanent magnet type having a reversible drive shaft 280 extending axially outwardly thereof. The drive shaft 280 retains at its end a helically toothed worm 282 adapted to mesh with the external teeth 269 provided on the nut member 268.

Figure 12:
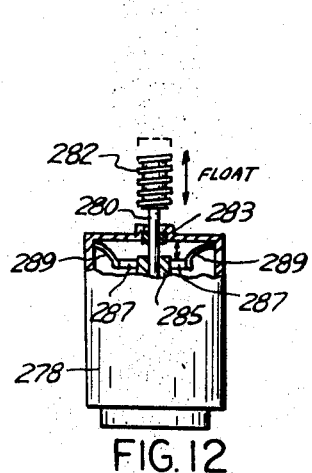
FIG. 12 is a longitudinal section through one of the drive motors and associated worm shaft employed in the mirror assembly of FIG. 9.

Preferably, either the drive shaft 280 of the electric motor 278 or the worm 282 is arranged such, relative to the motor, as to provide an amount of axial play or float as more clearly shown in FIG. 12 to provide for a "spin" start upon energization of the motor 278. With reference to FIG. 12, it will be seen that the drive shaft 280 is supported in a bearing 283 and is inwardly of the motor provided with an armature 285 adapted for engagement with opposite contact points 287 which are resiliently supported within the motor by means of springs 289 to thereby permit limited axial floating of the drive shaft 280 between the upper end of the armature 285 and the bearing 283 to accommodate a torque buildup prior to actuation of the gear mechanism.

Initial movement of the mirror from a prior adjusted position is effected by coaction between the torque buildup of the motor and the stored energy of the compressed portion of the resilient stop member 262 which tends to assume its normal uncompressed shape and thereby acting on the mirror in the direction of desired adjustment.

This arrangement is an important feature of the present invention since it has been found in conventional designs employing electric motors with nonfloating drive shafts that the motors, when energized, tend to stall if the mirror assembly is tight against a rigid stop or is jammed by other means, such as by contamination or icing conditions in freezing temperatures. Conventional motors with nonfloating drive shafts have not been able to overcome the jamming condition of the mirror assembly and thus proved useless under these conditions. Applicant's improved structure including the floating drive shaft 280 permits the motor 278 to build up sufficient torque to be able to break the jamming of the mirror assembly and in which the resiliency of the stop member 262 considerably aids to effect initial movement of the mirror.

It will be obvious from the foregoing description and the appended drawings, that the present invention provides an improved remote control rearview mirror assembly which is effectively operable under all operating conditions.

By the present pivoting arrangement and pivot point location, the mirror, when not in operation, is solidly supported on three pivot points and the dual push-pull pivot connections to the mirror are such as to always solidly support the mirror in any adjusted position to prevent flutter or vibration of the mirror.

The center ball pivot arrangement for the mirror includes a resilient backup washer and is adjustable to preload the ball joint and vary the tension between the ball joint and the mirror, such that the mirror attachment will be securely retained in the adjusted position during travel of the vehicle.

The remote actuation is by means of electric motors connected to a switch located in the driver's compartment for selective actuation of either motor, and the motors are each provided with an axially floating drive shaft or floating worm to permit the motors to build up sufficient torque so as not to stall under load.

The longitudinally movable adjusting rods are connected by a ball joint to the mirror and thus, upon actuation, provide a positive push or pulling force on the mirror without shifting the pivot points on the mirror to thereby provide accurate and positive angular mirror adjusting.

In one embodiment of the present invention, the mirror and remote control mechanism is contained in a surrounding shell which is connected by a universal ball joint to the support on the vehicle. By this arrangement, the mirror assembly can be manually adjusted in case the remote control mechanism should fail or to obtain additional fine adjustment of the mirror. The manual adjustment arrangement does not affect the remote control mechanism since the complete mirror and mirror-adjusting mechanism pivots together with the shell around the ball joint of the shell.

The present invention has been described and shown by example of various preferred embodiments, however, it will be obvious that various modification in structure and arrangement can be made by a person skilled in the art to which the

What is claimed is:

1. A power operated remote control rearview mirror assembly for an automotive vehicle or the like, in which a mirror having a reflective surface and a backside supported by a mirror support plate disposed on the backside of said mirror, a spherical mounting member upon which said mirror and said support plate are clamped for pivotal movement around a horizontal and vertical axes, and a support member carries said spherical mounting member, the improvement comprising: a pair of ball sockets provided in said mirror support plate in spaced relation to said spherical mounting member and defining with said spherical mounting member a triangular pattern, a pair of rods each being exteriorally threaded and projecting from said mirror support, each of said rods having an end pivotally secured in one of said sockets and secured therein against rotational and axial displacement relative to said mirror support plate; a pair of nuts rotatably supported by said support member, each nut engaging one of said threaded rods; electric power means for selectively rotating said nuts to pivotally adjust said mirror and said support plate about said spherical mounting member, and a switch positioned within the vehicle movable to multiple spaced positions to energize said electric power means to angularly adjust said mirror.

2. In the mirror assembly as defined in claim 1, wherein said power means includes a separate drive motor for each nut.

3. In the mirror assembly as defined in claim 1, wherein said power means includes a single electric motor which is selectively shiftably into and out of driving engagement with either of said nuts.

4. In the mirror assembly as defined in claim 1, wherein each of said nuts has an axial bore surrounding said threaded rods, resilient means are attached to each of said nuts and have a position transversely intersecting said bore for threading engagement with said threaded rods, said portion being resiliently deflectable to permit axial movement of said threaded rods relative to said nuts when said nuts are retained against rotation.

5. In a remote control mirror for a vehicle, a mirror, support means fixed to said mirror and movable about a central axis, a pair of threaded rods nonrotatably secured to said support means in spaced relation to said axis, rotatably nut means engageable with said threaded rods, actuatable electric motor means for driving said nut means to selectively advance and retract said threaded rods, thereby tilting said mirror about said axis, and a resilient stop for said support means located between said central axis and the points of attachment of said threaded rods to said support means, said electric motor means including at least one electric motor having a shaft, a drive gear mounted on said shaft in continuous engagement with one of said rotatable nut means, and resilient means supporting said shaft for initial axial displacement upon actuation of said motor to accommodate a torque buildup by said motor prior to driving said rotatable nut means, said torque buildup and the resiliency of said stop cooperating to initially move said mirror support and the mirror fixed thereto upon actuation of said electric motor means.

UNITED STATES PATENT AND TRADEMARK OFFICE
CERTIFICATE OF CORRECTION

PATENT NO. : 3,609,014
DATED : September 28, 1971
INVENTOR(S) : Arthur W. Kurz, Jr.

It is certified that error appears in the above-identified patent and that said Letters Patent is hereby corrected as shown below:

Column 10, line 7, "position" should be -- portion --.

Signed and Sealed this

Twenty-third Day of September 1986

[SEAL]

Attest:

DONALD J. QUIGG

Attesting Officer

Commissioner of Patents and Trademarks